United States Patent [19]

Berridge, Jr. et al.

[11] Patent Number: 4,491,868
[45] Date of Patent: Jan. 1, 1985

[54] VIDEO IMAGE COMPENSATOR FOR INSPECTION APPARATUS

[75] Inventors: Lawrence F. Berridge, Jr.; Amir R. Novini, both of Stow, Ohio

[73] Assignee: Inspection Technology Inc., Akron, Ohio

[21] Appl. No.: 261,280

[22] Filed: May 6, 1981

[51] Int. Cl.³ .......................... H04N 7/02; H04N 7/18
[52] U.S. Cl. ...................................... 358/139; 358/93; 358/106; 358/226
[58] Field of Search ................ 358/93, 106, 107, 139, 358/226; 356/394, 397

[56] References Cited

U.S. PATENT DOCUMENTS

| 2,772,600 | 12/1956 | Walker | 358/226 |
| 3,740,467 | 6/1973 | Kubo et al. | 358/106 |
| 3,902,811 | 9/1975 | Altman et al. | 358/106 |
| 4,234,890 | 11/1980 | Astle et al. | 358/139 |
| 4,326,219 | 4/1982 | Griesshaber | 358/139 |

FOREIGN PATENT DOCUMENTS 720799  3/1980  U.S.S.R. ............... 358/139

OTHER PUBLICATIONS

Kaspar—A Painless Slide into Accuracy—Broadcast Engineering, Apr. 1976, pp. 32, 34, 35.
Photo Research Applications Bulletin #100—Spectra® TV Optoliner—Projects the Perfect Image—1971.
Photo Research Applications Bulletin #507—Spectra TV optoliner—The High Resolution Image Projector—1972.
Gregory—A Software-Based Television Image Analysis System—vol. 88, Feb. 1979, SMPTE Jour., pp. 117, 118.

Primary Examiner—Joseph A. Orsino, Jr.
Attorney, Agent, or Firm—Oldham, Oldham, & Weber Co.

[57] ABSTRACT

A video image compensator for inspection apparatus is presented for utilization in a system of the type in which an image of a workpiece is digitized and compared against stored data representing a workpiece of known acceptable quality. The invention compensates for instability, drift, and distortion inherently present in vidicons by providing a test pattern for periodic viewing by the vidicon, and providing therefrom data from which scale factors and image shift data can be generated. Subsequent live images of workpieces can then be scaled and shifted prior to correlation with the stored reference to compensate for instability, drift, and distortion of the vidicon. A mirror is used to alternately direct the field of view of the vidicon to either the test pattern or the workpiece target. In one embodiment, the mirror is made selectively transparent to allow the workpiece to be viewed, while in an alternate embodiment, the mirror is physically deflected from the vidicon's field of view.

10 Claims, 3 Drawing Figures

VIDEO IMAGE COMPENSATOR FOR INSPECTION APPARATUS

TECHNICAL FIELD

This invention lies in the art of non-contacting industrial inspection apparatus. More particularly, the invention relates to video inspection apparatus in which digitized video images of selected areas of an object are compared against preselected reference values. Yet more particularly, the invention presents a means for compensating for instability, drift, and distortion of the video image generated by the vidicon of the system.

BACKGROUND ART

Reference is now made to copending patent application Ser. No. 207,748, for "Operator Programmable Inspection Apparatus," filed Nov. 17, 1980, and assigned to Inspection Technology, Inc., of Akron, Ohio, the assignee of the instant invention. This copending patent application presents in detail a system including a vidicon which is used to view workpieces, for example on an assembly line, and to generate a composite output signal of the RS-170 type. This signal is digitized and then compared against a stored digital image corresponding to a workpiece of known acceptable quality. Comparison is made by a digital processor under program control, and a determination is then made as to the acceptability of the workpiece based on the comparison.

It will be understood that many systems utilizing the teachings of the aforementioned copending patent application require a plurality of vidicons for simultaneous inspection of a number of areas on a large workpiece. It will also be appreciated that such vidicons, while being attractive from the standpoint of price, are given to problems of instability, distortion, and both physical and gray scale drift of the image with time, temperature, and the like. Present day solid state cameras are capable of overcoming certain of these problems, but the cost of such cameras is on the order of ten to thirty times that of a corresponding industrial grade vidicon. Additionally, solid state cameras are known to have typically slow scan cycles, low sensitivity, gray scale drift, and the inherent problem of "streaking." Of course, as is well known to those skilled in the art, the distortion experienced by a typical vidicon is either "pin cushion" or "barrel" distortion, most typically occurring at the edges or fringes of the video frame. While this particular type of distortion is not of grave importance, if the inspection apparatus is to be of optimum geometric accuracy, compensation must be made.

Applicants are unaware of any inexpensive and yet successful attempts in the art to overcome the foregoing problems which are experienced in the use of vidicons for inspection apparatus. Typically, the need for sensitivity or resolution in the system has not required such compensation. However, optimization of video inspection techniques requires that either expensive solid state cameras be utilized, or that compensation be made for the problems experienced with vidicons. It will be appreciated that the term vidicon as used herein generically refers to cameras providing a composite electrical output signal corresponding to the video image being sensed.

DISCLOSURE OF INVENTION

In light of the foregoing, it is an object of the instant invention to present a video image compensator for inspection apparatus which compensates for both physical and gray scale drift, distortion, and instability in vidicons.

Another object of an aspect of the invention is to provide a video image compensator for inspection apparatus which allows for a vidicon to obtain the characteristic function of a solid state camera without the inherent drawbacks, slow scan cycles, low sensitivity, gray scale drift, and of "streaking."

Still an additional object of an aspect of the invention is to provide a video image compensator for inspection apparatus which allows such apparatus to achieve consistent and reliable readings of workpieces being monitored.

Yet another object of an aspect of the invention is to provide a video image compensator for inspection apparatus which is accurate and reliable in operation, inexpensive to construct, and readily adapted to presently existing systems.

The foregoing and other objects of the invention which will become apparent as the detailed description proceeds are achieved by an optical inspection system including video image compensation, comprising: a target to be inspected; a test piece; a camera having a field of view; and means interposed among said target, test piece, and vidicon for selectively directing said field of view of said camera from said target to said test pattern.

BRIEF DESCRIPTION OF DRAWINGS

For a complete understanding of the objects, techniques, and structure of the invention, reference should be had to the following detailed description and accompanying drawings wherein.

BEST MODE FOR CARRYING OUT THE INVENTION

Figure 1:
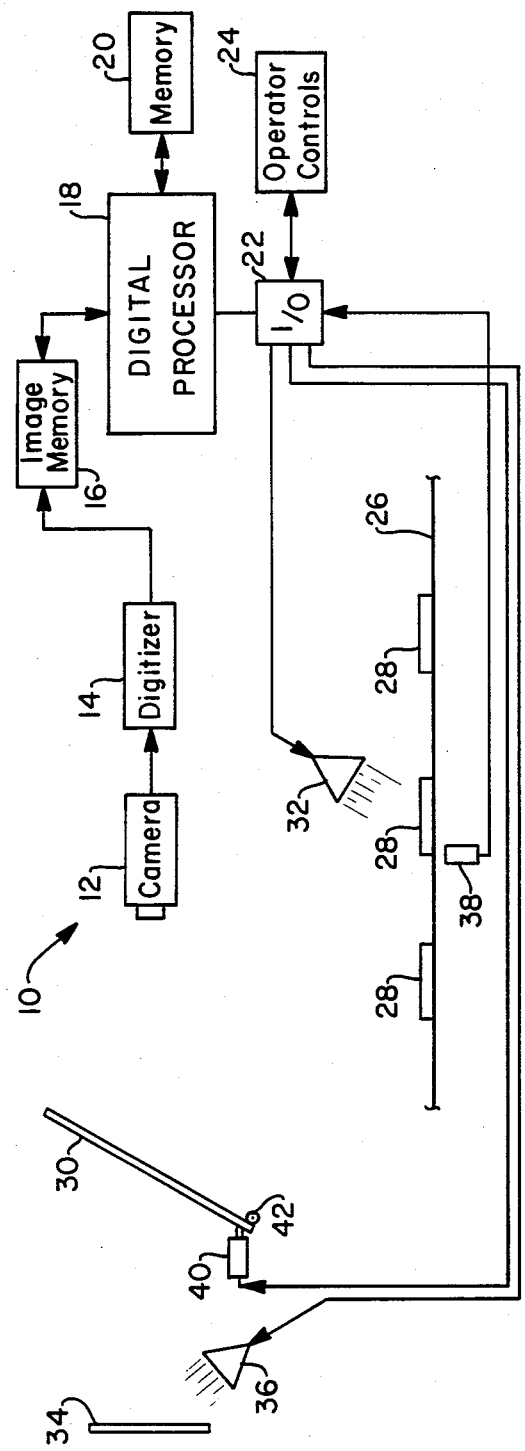
FIG. 1 is a schematic block diagram of a video inspection system made in accordance with the teachings of the invention.

Referring now to the drawings and more particularly FIG. 1, it can be seen that a digitized optical inspection system is designated generally by the numeral 10. The system includes a camera or vidicon 12 of the type that produces a composite output signal of the RS-170 type corresponding to its field of view. This output signal is passed to an image memory 16 for storage. Accordingly, there is maintained within the memory 16 binary or digitized data corresponding to the field of view of the vidicon 12. Access is made to the image memory 16 by means of a digital processor 18 which is under program control maintained in the memory 20. Also maintained in the memory 20 is digitized data corresponding to a workpiece of known acceptable quality. As will become apparent hereinafter, there is also maintained in the memory 20 data corresponding to a test pattern, to be discussed hereinafter.

The digital processor 18, in standard fashion, communicates through an input/output module 22 to peripheral equipment, such as operator controls 24. It will be appreciated that the specific structure of the system just described is set forth in detail in the aforementioned copending patent application.

With continued reference to FIG. 1, it can be seen that a conveyor 26 of a typical nature in an industrial environment is provided for receiving and transporting workpieces or parts 28 therealong. A mirror 30 is maintained within the field of view of the vidicon 12 at an angle of obliquity which allows the camera 12 to view the conveyor 26 and the workpieces 28 thereupon. A target lamp 32, under control of the processor 18 via the module 22 is positioned to illuminate a workpiece 28 when it comes into position for view by the camera 12. Such positioning may be sensed by a position sensor 38 which may constitute a limit switch, photodetector, or the like. In any event, the sensor 38 communicates with the processor 18 via the input/output module 22 to advise that a workpiece 28 is in proper position and registration for view by the vidicon 12.

Maintained behind the mirror 30 is a test piece 34 which may be selectively illuminated by means of a test lamp 36 under processor control. In one embodiment of the invention, the mirror 30 is contemplated as being a single surface silvered mirror of the type which can be made effectively transparent by illuminating the backside thereof. Accordingly, the vidicon 12 may be caused to view the workpiece 28 when the lamp 32 is illuminated and the lamp 36 is turned off. In the same manner, with the lamp 36 illuminated and the lamp 32 turned off, the mirror 30 is rendered transparent and the vidicon 12 views the test piece 34, which test piece has a test pattern thereon which will be discussed hereinafter.

In another embodiment of the invention, the mirror 30 is a standard mirror which cannot be rendered transparent as discussed above. In this event, the mirror 30 is hingedly or pivotally connected as at 42 and is caused to swing into and out of the field of view of the camera 12 by means of a solenoid 40. Of course, the solenoid 40 is under processor control and the mirror 30 would typically be biased to a normal angle of obliquity which will allow the vidicon 12 to view the workpieces 28. Spring biasing and stops can be used for such purpose, or alternatively the solenoid 40 may be interconnected to the mirror 30 by an appropriate linkage. In any event, the camera 12 can view either the workpieces 28 or the test pattern of the test piece 34 as selectively determined by the processor 18 under program control.

Figure 2:
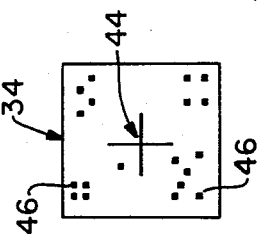
FIG. 2 is a front elevational view of a test pattern of typical nature for use in the concept of the invention.

With reference now to FIG. 2, it can be seen that the test piece 34 is characterized by a cross-hair or reticle 44 and test patterns 46 thereon. As will be readily apparent to those skilled in the art and hereinafter, the cross-hair 44 can be used to make horizontal or vertical shifts of the output of the vidicon 12 to compensate for physical drift. Similarly, the test patterns 46 may be used, once drift has been compensated, to generate geometric scale factors for the various quadrants or selected sections of the video image. It may be preferred that the test pattern 46 actually correspond to a known valid workpiece or, alternatively, the test patterns 46 may be of any configuration which will seek to test areas characterized by distortion in the video image. Most commonly, such geometric or physical distortion as the "pin cushion" or "barrel" type occur at the top and bottom or side edges of the video frame. By having the digitized pixel values of the test patterns stored in the memory 20, correlation can be made with the image sensed by the vidicon 12 when viewing the test piece 34 to establish a scale factor or look-up table to adjust values sensed by the vidicon. Of course, the position of the cross-hair 44 is also stored in the memory 20. It should also be appreciated that, in a preferred embodiment of the invention, the test piece 34 and the camera 12 are fixedly secured. However, the technique of the invention allows for compensation of the video image if the camera 12 has, indeed, been moved.

It should also be appreciated that the test piece 34 may be used for correcting for shifts in the gray scale associated with the camera or vidicon 12. For example, the test patterns 46 may include pure black or pure white areas, or gray areas inbetween. The gray scale values of such areas as sensed by the camera 12 may be compared against the known values of such areas. From such comparisons, scale factors may be generated for modifying the gray scale output of the camera 12 to compensate for gray scale drift.

Figure 3:
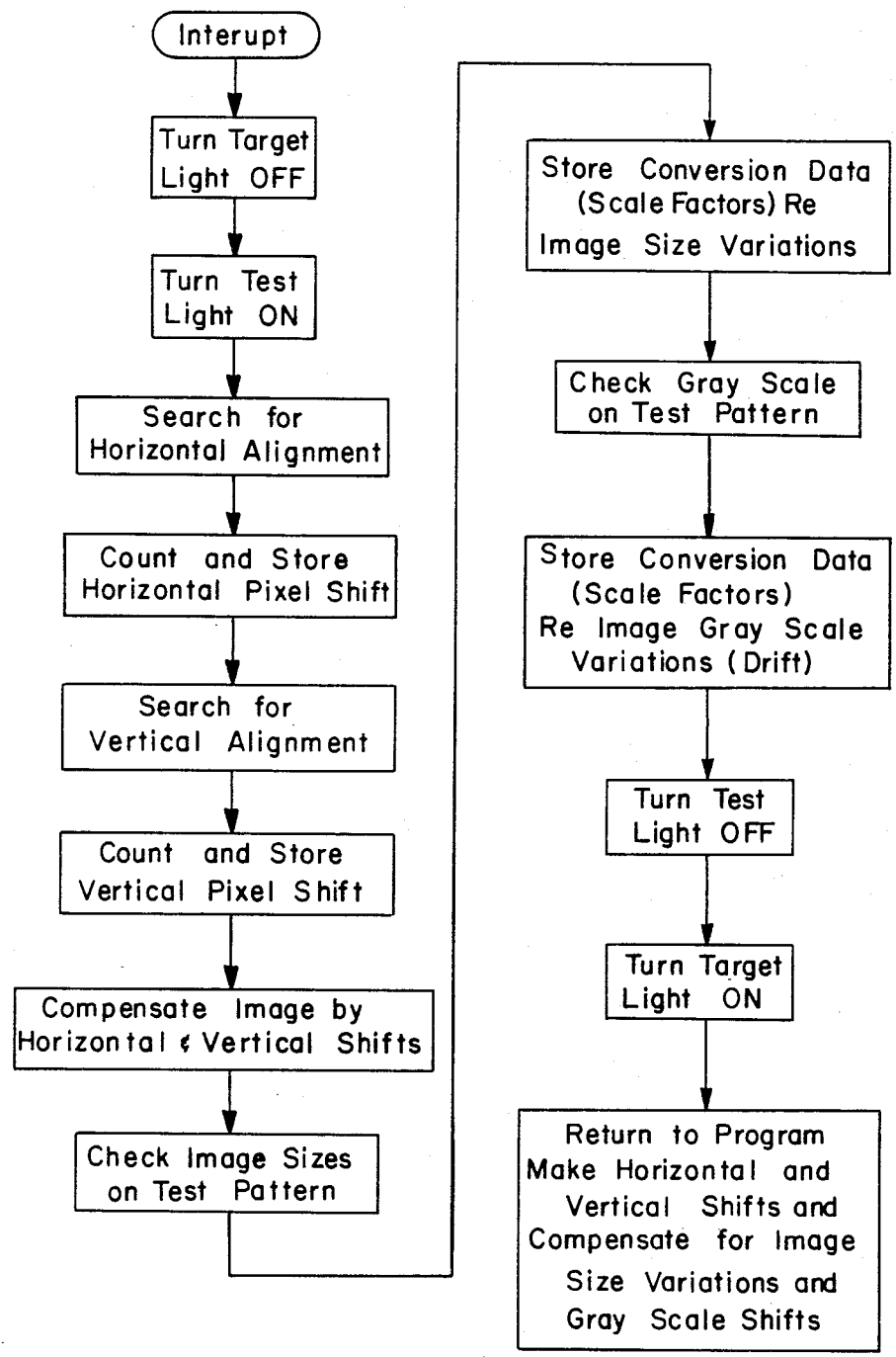
FIG. 3 is a flow chart illustrating the method by which compensation is achieved through the invention.

Referring now to FIG. 3, the processor flow chart for achieving the testing technique of the invention is shown. This flow chart is an interrupt subroutine of the master program used for controlling the processor 18 to achieve the video inspection techniques of the system. The interrupt subroutine can be entered into at such frequency as is desired, from once a day to once every several minutes. In any event, the routine proceeds with a turning off of the target light 32 and illumination of the test light 36. The camera 12, at this time, may view the test piece 34 through the mirror 30 which has now been rendered transparent. The processor 18 may then seek horizontal alignment of the digitized image in the memory 16 with the test image in the memory 20 by seeking to align the vertical member of the cross-hairs 44 with the corresponding pixels by which the image was shifted horizontally to achieve such alignment is then counted and stored. Vertical alignment is then tested by shifting the digitized image of the vidicon 12 until the horizontal line of the cross-hairs 44 is aligned with the corresponding pixels stored in the memory 20. Again, the number of pixels shifted vertically, and the sign thereof, is also stored.

Knowing the magnitude and sign for horizontal and vertical shifts to compensate for drift, the entire image stored in the memory 16 can be so shifted. With the image of the test piece 34 shifted to compensate for drift, a count of the pixel size of the various elements of the test pattern may be made and compared against the pixel size of the corresponding data stored in the memory 20. If the vidicon 12 is emitting a distorted signal such that the pixel size from the test piece 34 differs from that stored in the memory 20, conversion data or scale factors are developed to correlate the size of the element on the piece 34 to the number of pixels which should be present without distortion. With such scale factors maintained in look-up tables, the digitized output of the vidicon 12 can then be varied or scaled to correct distortions.

With compensation made for geometrical and physical shifts and distortion, the subroutine next seeks to compensate for gray scale shift. Selected areas on the test pattern are compared for gray scale value against predetermined set values. Based on the comparisons conversion data or scale factors are generated and stored such that future output signals of the camera can be scaled accordingly to provide an accurate indicia of actual gray scale values.

As can be seen, after scale factors for the gray scale are stored, the lamps 32,36 are restored to their inspection state and a return is made to the program of the processor 18. The system 10 then functions with appropriate horizontal and vertical shifts of the image from the memory 16 being made, with compensation being made for image size variations or distortions, and with appropriate compensation being made for gray level shifts.

Before leaving the concept of scale factors, it should be noted that scale factors may be generated for quadrants, octants, or the like, of the image as a whole. In other words, each octant of the image would have scale factors associated therewith by which the digitized data of that octant would be scaled. In a more complex arrangement, a scale factor may be provided on a pixel-by-pixel basis, but such resolution or accuracy is generally not required.

In the embodiment of the invention wherein the mirror 30 is pivotal above the hinge 42 under control of the solenoid 40, the flow chart of FIG. 3 is altered to the effect that selective illumination of the lamps 32,36 is not necessary. Instead, upon entering the interrupt subroutine, the solenoid 40 causes the mirror 30 to assume a horizontal posture about the pivot point 42. The vidicon 12 then views the test piece 34 and performs the alignment and scale factoring of the flow chart of FIG. 3. Prior to returning to the program, the solenoid 40 is deactivated to allow the mirror 30 to assume its angle of obliquity to the vidicon 12 to achieve further testing of the pieces 28.

Thus it can be seen that the objects of the invention have been achieved by the structure presented hereinabove. While in accordance with the patent statutes only the best mode and preferred embodiments of the invention have been presented and described in detail, it is to be understood that the invention is not limited thereto or thereby. Accordingly, for an appreciation of the true scope and breadth of the invention, reference should be had to the appended claims.

What is claimed is:

1. An optical inspection system including video image compensation, comprising:
    a camera having a field of view and providing an output signal corresponding thereto;
    a target to be inspected;
    a test piece for achieving horizontal and vertical alignment of said output signal of said camera, and for achieving scaling of said output signal of said camera as to both geometric and gray scale values;
    means interposed among said target, test piece, and camera for selectively directing said field of view of said camera from said target to said test piece;
    processing means for digitizing, shifting, and scaling said output signal corresponding to said target as a function of said output signal corresponding to said test piece; and
    storage means connected to said processing means for receiving therefrom and storing said output signal corresponding to said target, digitized, shifted, and scaled as a function of said output signal corresponding to said test piece.

2. The optical inspection system according to claim 1 wherein said means comprises a reflective surface.

3. The optical inspection system according to claim 2 wherein said reflective surface comprises a mirror.

4. The optical inspection system according to claim 3 wherein said mirror is selectively transparent.

5. The optical inspection system according to claim 3 which further includes means connected to said mirror for selectively moving said mirror into and out of said field of view of said camera.

6. The inspection apparatus according to claim 2 wherein said reflective surface is maintained before said camera at an angle of obliquity thereto.

7. The inspection apparatus according to claim 6 wherein said reflective surface is pivotally maintained before said camera.

8. The inspection apparatus according to claim 6 wherein said reflective surface comprises a selectively transparent mirror.

9. The optical inspection system according to claim 1 wherein said means for achieving a horizontal and vertical alignment comprises a reticle, and wherein said means for scaling comprises an array of spaced-apart areas of varying geometric sizes and gray level shades.

10. The optical inspection system according to claim 1 wherein said means for selectively directing said field of view comprises a selectively transparent mirror obliquely interposed between said target and said test piece, a first lamp in juxtaposition to said target, and a second lamp in juxtaposition to said test piece, said first and second lamps being mutually exclusively illuminated.

* * * * *